L. R. SPENCER.
ANTIFRICTION BEARING.
APPLICATION FILED FEB. 3, 1917.
1,240,382.
Patented Sept. 18, 1917.
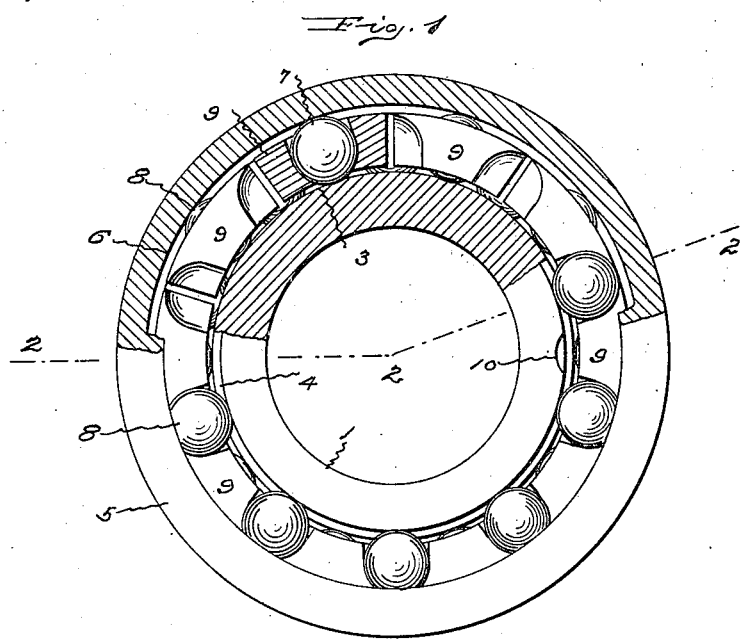
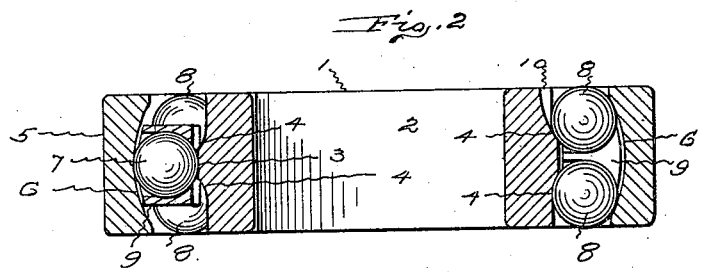
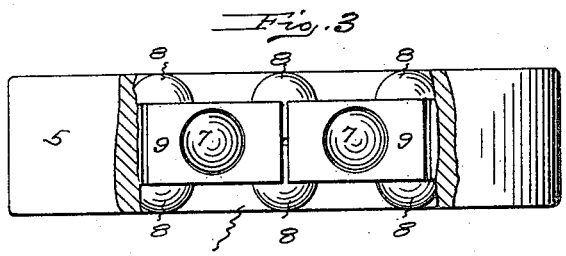
INVENTOR.
Louis R. Spencer
BY
Harry P. Williams
ATTORNEY.

UNITED STATES PATENT OFFICE.

LOUIS R. SPENCER, OF HARTFORD, CONNECTICUT.

ANTIFRICTION-BEARING.

1,240,382.  Specification of Letters Patent.  Patented Sept. 18, 1917.

Application filed February 3, 1917. Serial No. 146,399.

*To all whom it may concern:*

Be it known that I, LOUIS R. SPENCER, a citizen of the United States, residing at Hartford, in the county of Hartford and State of Connecticut, have invented a new and useful Improvement in Antifriction-Bearings, of which the following is a specification.

This invention relates to a radial load anti-friction bearing which has balls arranged to not only sustain the radial load, but all longitudinal thrusts.

The object of the invention is to so design such a bearing that without increasing the dimensions above the recognized standards it will have maximum strength, minimum friction and long life.

In attaining this end the bearing is provided with three rings of balls spaced by a sectional separator, the middle ring of balls being subjected to the radial load only while the ring of balls on one side resists the longitudinal thrust in one direction and the ring of balls on the other side resists the longitudinal thrust in the other direction so as to relieve the balls which sustain the radial load from all sidewise strain or cramping. The inner bearing member or cone is made in a single piece with an exterior cylindrical raceway for the balls that sustain the radial load and a curved raceway on each side of the flat raceway for the balls that sustain the longitudinal thrusts, while the outer bearing member or cap is made in a single piece with a curved raceway that is common to all of the balls.

Figure 1 of the accompanying drawings shows a side view, with a portion cut in section, of a bearing that embodies this invention. Fig. 2 shows a diametric section of the bearing taken on the plane indicated by the dotted line 2—2 on Fig. 1. Fig. 3 shows an edge view with a portion of the outer bearing member broken away.

The inner member or cone 1 is formed from a single piece of hard metal with an inner bore 2 of standard diameter. On the exterior of the inner member around the middle is a flat ball race 3 and on each side of the cylindrical race is a curved ball race 4, these raceways being treated and ground in the usual manner to provide hard and smooth wearing surfaces. The outer member or cap 5 is formed from a single piece of hard metal having standard exterior dimensions. The inner wall of this outer member is curved transversely to form a bearing surface or raceway 6 for all of the balls.

There are three rings of balls, the balls 7 of the middle ring fitting between the cylindrical raceway 3 on the exterior of the inner member and the curved raceway 6 on the interior of the outer member. This ring of balls sustains the major portion of the radial load, and as on the inside they travel on a cylindrical raceway they cannot be cramped by any longitudinal thrusts that would tend to carry them sidewise. The outer rings of balls 8 fit between the curved raceways 4 on the exterior of the inner member and the curved raceway 6 in the interior of the outer member. The curvature of the raceway 6 in the interior of the outer member is such that the outer rings of balls cannot, when once in place, roll out from between the members. The outer balls are arranged intermediate of the middle balls and the balls are held properly spaced by separating blocks 9 that have pockets for receiving the balls.

In assembling the bearing the balls of one outer ring are first placed in the inner member, then the separating blocks containing the middle balls are placed in position, and after the inner member is inserted the balls of the other outer ring are inserted one at a time, a small groove 10 being formed in the edge of the inner member for this purpose.

With this structure the load is distributed over an extended surface. The main radial load is sustained by the middle ring of balls without interference from or wear incident to longitudinal thrust strains, and the longitudinal thrusts in both directions, whether due to inaccuracies of manufacture or looseness resulting from wear, are sustained by the side rings of balls that are not cramped by the radial strains so that the bearing will run with a minimum amount of friction, have long life and sustain heavy loads without necessitating an increase of its size from the recognized standard dimensions of the bearings commonly used.

The invention claimed is;

1. An anti-friction bearing comprising an inner annular member with a cylindrical ball-raceway about its middle and a conoidal ball-raceway on each side of the middle, an outer annular member with a concaved ball-raceway around its interior, a ring of radial-load bearing-balls fitting between the cylindrical raceway of the inner member and the concaved raceway of the outer member, and two rings of longitudinal-thrust bearing-balls fitting between the conoidal raceways of the inner member and the concaved raceway of the outer member.

2. An anti-friction bearing comprising an inner annular member with a cylindrical ball-raceway about its middle and a conoidal ball-raceway on each side of the middle, an outer annular member with a concaved ball-raceway around its interior, a ring of radial-load bearing-balls fitting between the cylindrical raceway of the inner member and the concaved raceway of the outer member, two rings of longitudinal-thrust bearing-balls fitting between the conoidal raceways of the inner member and the concaved raceway of the outer member, the balls of the outside rings alternating with the balls of the middle ring.

3. An anti-friction bearing comprising an inner annular member with a cylindrical ball-raceway about its middle and a conoidal ball-raceway on each side of the middle, an outer annular member with a concaved ball-raceway around its interior, a ring of radial-load bearing-balls fitting between the cylindrical raceway of the inner member and the concaved raceway of the outer member, two rings of longitudinal-thrust bearing-balls fitting between the conoidal raceways of the inner member and the concaved raceway of the outer member, the balls of the outside rings alternating with the balls of the middle ring, and spacing blocks separating the balls.

LOUIS R. SPENCER.

Copies of this patent may be obtained for five cents each, by addressing the "Commissioner of Patents Washington, D. C."